(12) United States Patent
Travis

(10) Patent No.: US 6,608,961 B2
(45) Date of Patent: Aug. 19, 2003

(54) OPTICAL SYSTEM INCLUDING A PLANAR WAVEGUIDE

(76) Inventor: Adrian Robert Leigh Travis, Wrangaton House, Wrangaton, Douth Devon TQ10 9HH (GB), TQ10 9HH ( * ) Notice: Subject to any disclaimer, the term of this patent is extended or adjusted under 35 U.S.C. 154(b) by 63 days.

(21) Appl. No.: 09/812,722

(22) Filed: Mar. 20, 2001

(65) Prior Publication Data

US 2002/0008854 A1 Jan. 24, 2002

(30) Foreign Application Priority Data

Mar. 20, 2000 (GB) .............................................. 0006709

(51) Int. Cl.$^7$ ................................................. G02B 6/10
(52) U.S. Cl. ...................................................... 385/146
(58) Field of Search .......................... 385/120, 37, 50, 385/115, 116, 146, 121, 147, 901, 119; 362/554, 556; 349/62, 95

(56) References Cited

U.S. PATENT DOCUMENTS 3,941,467 A * 3/1976 Kapany et al. ............... 353/34
5,381,502 A 1/1995 Veligdan ...................... 385/115
5,668,913 A 9/1997 Tai et al. ..................... 385/146
6,002,826 A * 12/1999 Veligdan ...................... 385/120
6,295,308 B1 * 9/2001 Zah .............................. 372/50

FOREIGN PATENT DOCUMENTS

| EP | 0 663 600 A1 | 7/1995 |
| WO | WO 00/04407 | 1/2000 |

* cited by examiner

*Primary Examiner*—Akm E. Ullah
(74) *Attorney, Agent, or Firm*—Gregory C. Smith; Garvey, Smith, Nehrbass & Doody, L.L.C.

(57) ABSTRACT

An optical waveguide system includes a generally planar waveguide 1 arranged so that light can be injected by a projector 2 into one edge at a range of out-of-plane angles. The waveguide 1 is tapered so that different out-of-plane angles, after being totally internally reflected for a certain distance, leave the waveguide at different respective points along the waveguide. This expands the image in the direction of propagation along the waveguide. Meanwhile the image is expanded transversely by a parallel-sided input waveguide 3. A large-area flat-panel display is thus created, or the planar waveguide can be used as a planar collimating light source or, using layers of controllable optical index, an optical switch.

19 Claims, 4 Drawing Sheets

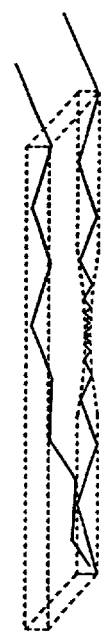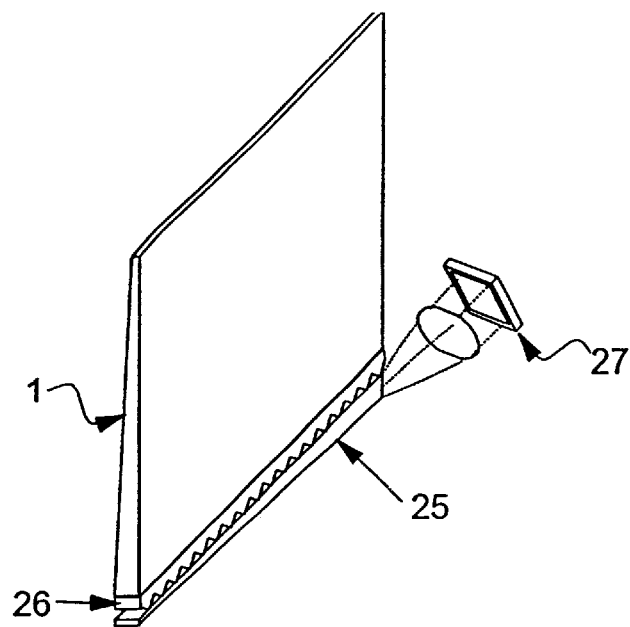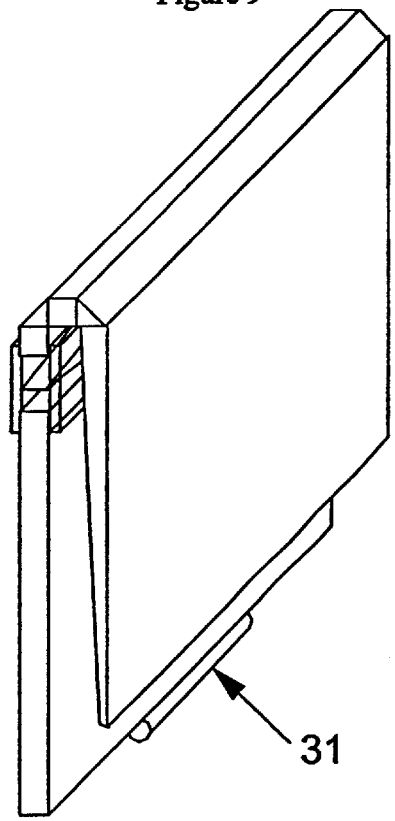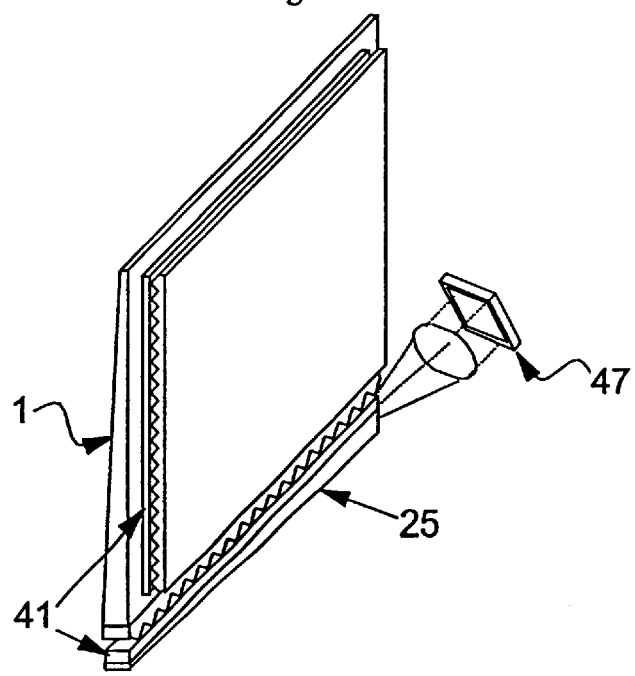
Figure 9
Figure 10
Figure 11
Figure 12

OPTICAL SYSTEM INCLUDING A PLANAR WAVEGUIDE

CROSS-REFERENCE TO RELATED APPLICATIONS

Priority of my GB Patent Application 0006709.0, filed Mar. 20, 2000, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to ways of making a flat-panel display by projecting the image from a microdisplay.

2. General Background of the Invention

Flat-panel displays which have screens large enough to stimulate the quick reactions of our peripheral vision will give pictures great immediacy, yet because they are flat the displays will fit easily onto the wall of a room. The size of conventional flat-panel displays however is limited by the resistor/capacitor time constant of the row and column transparent conductors, and by the area over which lithography can be sufficiently precise to make transistors. The cost of making active-matrix liquid-crystal displays with screen diagonals greater than one meter is prohibitive, and even the cheaper plasma displays are too expensive for most uses. However, costs decrease considerably with size and the 2" by 2" (5 cm×5 cm) liquid crystal displays used in video projectors are relatively cheap, while fingernail-sized microdisplays look set to cost only a few dollars.

Video projectors comprise a two-dimensional display, a projection lens and a translucent screen. The projection lens forms on the translucent screen a magnified image of the two-dimensional display which can be almost as big as one wants. Video projectors are cheap, so are becoming increasingly popular, but often the projector gets in the way of the viewer, or the viewer gets in the way of the projected light. Furthermore, unless the room lights are dimmed, the image looks washed out because the screen scatters background light as well as the projected image.

A group of video projectors is able to project a three-dimensional image if they are all put in the focal plane of a screen-sized lens. Each projector is positioned to form a picture in the plane of the field lens just as if the lens were a translucent screen, but unlike a translucent screen the field lens collimates the light so that the picture is visible from only a single direction. The other projectors form views which are made visible by the field lens to other directions so that the viewer sees an autostereoscopic three-dimensional image. In this application too, however, the projected light is easily blocked. What is needed is a display which is as cheap as a video projector, but is a slim, integrated device like a flat-panel display.

A display capable of expanding an image from a small projector into a large viewable plane is shown in U.S. Pat. No. 5,381,502 (James T. Veligdan). The plane is formed by a stack of thin sheet waveguides the edges of which on one side form the lines of the display. The stack is tapered to form a thin wedge, and each line of the image is injected into the appropriate sheet at the blunt end of the wedge, to emerge from the tapered face of the plane. The manufacturing of such a stack is not straightforward. Applicant is submitting herewith an Information Disclosure Statement of prior art patents, which applicant asks that they be incorporated herein by reference thereto.

BRIEF SUMMARY OF THE INVENTION

According to an aspect of the present invention there is provided a waveguide display or light modulator comprising a video projector arranged to emit modulated light rays generally along a direction of propagation, over a range of angles relative to that direction; and a waveguide extending along the axis of propagation and arranged to receive rays injected from the projector and to eject rays at a distance along the axis of propagation along the waveguide that depends on their angle of injection. Preferably means are also provided for magnifying the projected image in the transverse direction before it enters the waveguide; the waveguide can then take the form of a large display panel.

A simple way of making a waveguide eject the rays at a certain distance along its length (i.e. along the direction of the propagation of the rays within the waveguide) is to have the waveguide in a slab shape preferably of a uniform material but tapering along its length. This means that the angle of incidence of the trapped rays on the surface of the slab becomes ever steeper until waveguiding is no longer possible and the ray, or a portion of it, escapes from the surface of the waveguide, a process which can be assisted using suitable antireflection coatings. It can then be directed suitably towards the viewer. Of course, the steeper the initial angle of the rays into the waveguide, the sooner they escape, which means that the steepest injected rays are those that make the image over that part of the waveguide nearest the projector, and the flattest (nearest parallel) rays form the furthest parts of the image. This principle is known from, for instance, EP-A1-0663600 (Nitto Jushi Kogyo K.K.).

The magnifier can be itself a slab waveguide, positioned edge-on between the projector and the ejecting waveguide, and having the same width as the screen (i.e. of the ejecting waveguide) so as to allow the rays to spread out in the transverse direction but (assuming that the sides of the magnifying waveguide are parallel) to conserve the out-of-plane angle of the rays. The system can be folded over so that the tapered waveguide and the magnifying waveguide overlap.

As an alternative to the slab waveguide magnifier an essentially one-dimensional input waveguide can be used, which tapers transversely to the ejecting waveguide, being arranged along the input edge of the latter waveguide in such a way that light input at the thick end of the input waveguide is ejected along its length into the ejecting waveguide.

In an alternative aspect the invention is directed to a planar light source comprising an ejecting waveguide as aforesaid and a one- or zero-dimensional light source whose output is fed into the waveguide so as to emerge over the plane of the waveguide. This represents a simple way of providing a planar, in particular a collimated, light source such as is useful for displays.

The invention also envisages a large-area display in which a small-area image source is arranged to project an image into a slab waveguide much wider than the source, so that the image is contained in the plane of the waveguide but expands transversely, and emerges from the waveguide to be projected on to a screen arranged parallel but offset to the slab. Here the two-dimensional spread of the image is achieved on the one hand, as before, by the transverse spread within the waveguide and on the other hand, differing from the previous method, by allowing the light emerging from the end of the waveguide, still essentially collimated, to strike the screen obliquely.

For a better understanding of the invention embodiments of it will now be described, by way of example, with reference to the accompanying drawings.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 9 shows how a lens within the slab waveguide of a tapered waveguide display can be effected by a thinning of the waveguide;

FIG. 10 shows how a second tapered waveguide can be used to magnify the projected image in one dimension perpendicular to the axis of propagation;

FIG. 11 shows how the tapered waveguide optics behaves like a flat-panel version of a collimating lens, so that light projected into the tapered waveguide display from an unmodulated source such as a fluorescent lamp can be expanded so as to illuminate a liquid-crystal display with collimated light;

FIG. 12 shows how, like other light-modulating displays, the tapered waveguide display can be used as an optical switch.

DETAILED DESCRIPTION OF THE INVENTION

It is well known that light shone at a sufficiently shallow out-of-plane angle into a cuboid slab of transparent material will be reflected back and forth by total internal reflection off the sides of the cuboid until the light reaches the opposite end to that at which it was injected. The light is said to be guided, the slab of material is said to be a waveguide, and the out-of-plane angle of the light remains constant as it propagates through the waveguide.

Figure 1:
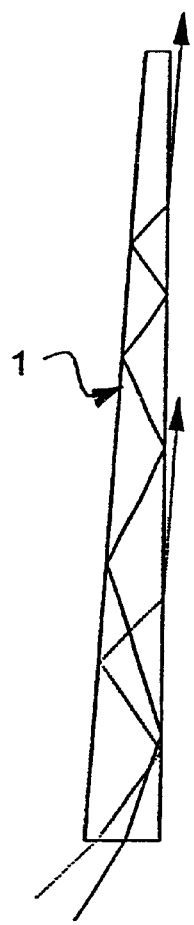
FIG. 1 illustrates how the distance which a ray of light propagates along a tapered waveguide is determined by the angle at which the ray is injected.

If, however, light is shone into the thick end of a waveguide 1 which tapers, as shown in FIG. 1, then the out-of-plane plane angle measured with respect to one face of the taper 1 will change each time the ray reflects off the opposite face of the taper 1. Eventually the ray propagates far enough along the taper 1 that the out-of-plane angle becomes greater than the critical angle, and at this point light escapes the taper 1. The distance into the tapered waveguide 1 at which the ray leaves the taper 1 is therefore determined by the angle at which the ray is injected, and this is a key phenomenon exploited in this invention.

Figure 2:
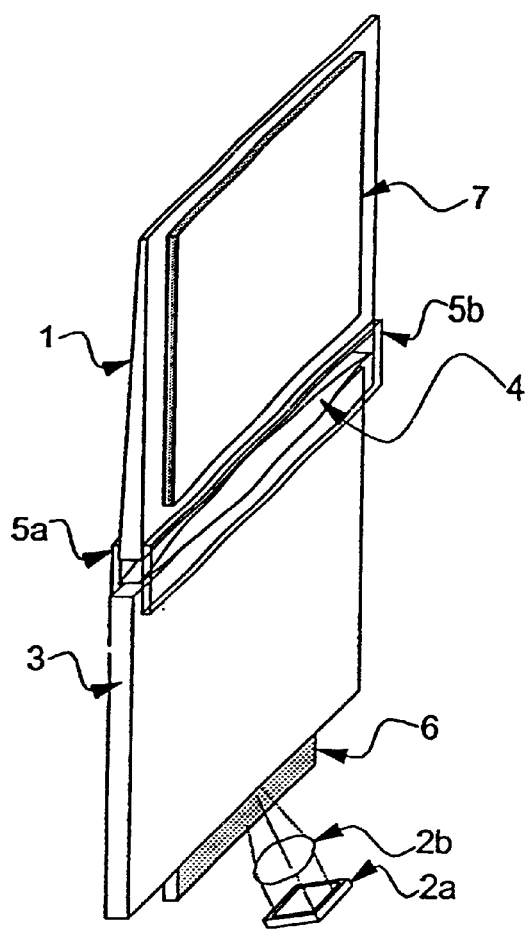
FIG. 2 illustrates a tapered waveguide display.

The tapered waveguide display shown in FIG. 2 operates by injecting into the thick end of a tapered rectangular waveguide 1 individually collimated rays, one from each pixel of a video projector 2, itself composed of a microdisplay 2a and a projection lens 2b. The injection takes place via an input slab waveguide 3 of the same width as the tapered waveguide. The projector is arranged slightly out of the plane of the waveguides so as to inject the rays in at an angle to the plane. Rays from the video projector 2 are combined to a spot whose diameter approximately equals the thickness of the input slab waveguide 3, whose thickness is uniform and equals that of the thick end of the tapered waveguide 1. Light from the focused spot is injected into an edge of the slab waveguide 3 where the rays are confined to the plane of the slab 3, which is rectangular and of constant thickness, but expand to its full width by the time they reach its end. The rays then pass out of the opposite edge of the slab 3, through a cylindrical lens 4 whose axis is perpendicular to the plane of propagation, and into the thick end of the tapered waveguide 1. During this transition the rays continue to be confined by a pair of mirrors 5a, 5b whose front silvered surfaces are coplanar with the respective faces of the slab waveguide 3.

The focal line of the cylindrical lens 4 runs through the point at which rays are injected into the slab waveguide 3, so that upon entering the tapered waveguide 1 the rays all share the same in-plane angle. The column up which a ray propagates in the tapered waveguide 1 is now determined by the column of the microdisplay 2a from which the ray originated, and the out-of-plane angle of the ray is determined by the row of the microdisplay 2a from which the ray originated. (As seen in the plane of the paper in FIG. 2, the columns run across the page and the rows extend approximately bottom left to top right). Since the height at which rays leave the tapered waveguide 1 is determined by their out-of-plane angle, the 2D array of pixels on the microdisplay 2a is mapped one-to-one onto a 2D array of pixels on the face of the tapered waveguide 1.

As a ray zig-zags along the tapered waveguide, it will only illuminate one face of the tapered waveguide at a time. For both faces of the tapered waveguide to be continuously illuminated, any pixel on the microdisplay 2a should create a pair of counter-propagating rays which at any point have equal but opposite out-of-plane angles. This is done in the embodiment of FIG. 2 with a front-silvered mirror 6 placed beneath the slab waveguide 3 at the point of light injection.

It is well known that all unguided rays converge to or diverge from a point where their diameter is at a minimum. Rays may also behave like this within a waveguide and ideally rays will be at their minimum diameter as they emerge from the tapered waveguide 1, so that the pixels formed on the face of the tapered waveguide 1 are small. However, this is difficult to engineer, and an alternative is to set the diameter of injected rays equal to the thickness of the thick end of the tapered waveguide 1 so that the guiding action of total internal reflection prevents further divergence of the ray. Pixel diameters will then approximately equal the thickness of the thick end of the wedge; hence this thickness should be reduced as much as possible. Typically the thick end of the wedge might be 1 mm thick, and the thin end might be 0.2 mm thick, so if the screen is 1 meter high the angle of the taper is approximately 0.05°.

When rays leave the tapered waveguide 1 they will only just have exceeded the critical angle. A consequence of this is that the angle between the rays and the face of the tapered waveguide 1 will approximately equal the angle of the taper 1. For most displays an element such as a translucent screen 7 will be needed to scatter the rays to give an adequate angle of view, but the element must not be closer than approximately 20 microns, otherwise it will interfere with the evanescent waves of reflected rays. The size of the pixel formed on the translucent screen 7 by a ray will equal the diameter of the ray divided by the angle between the ray and the screen. The diameter of the emerging ray will be of the order of the depth of its evanescent wave just before the ray emerges, and if this is approximately 20 microns then the size of the pixel which it forms at an angle of 0.8 mrad to the screen will be 20/0.8=25 mm. If a smaller pixel is required then a second tapered waveguide identical to the first, but placed against it hypotenuse to hypotenuse, may be provided between the first tapered waveguide 1 and the translucent screen 7.

Only part of a ray will escape from a conventional waveguide when the out-of-plane angle of the ray slightly exceeds the waveguide's critical angle. The remaining fraction of the ray will continue to propagate down the waveguide, with a fraction escaping each time the ray is incident on the waveguide's surface. This causes a ray intended for one pixel to overlap with other pixels, with the result that the image is ghosted. The solution is to apply an antireflection coating. The thickness and indices of the layers of the coating can be designed using matrix theory of the kind found in "Single-mode optical fibre surface plasma wave chemical sensor" by A. J. C. Tubb, F. P. Payne, R. B. Millington and C. R. Lowe on pages 71–79 of Sensors and Actuators B: Chemical, volume 41, 1997 published by Elsevier Science. If a ray of wavelength $\lambda$ traveling in a dielectric of refractive index $n_0$, is incident at an angle $\theta_0$ to the normal of a series of planar dielectrics, with the m-th dielectric having refractive index $n_m$ and thickness $d_m$ then the reflection coefficient, r, is given by:

$$\text{where: } r = \frac{n_{\theta 0} - n_{\theta e}}{n_{\theta 0} + n_{\theta e}} \qquad n_{\theta 0} = \frac{n_0}{\cos\theta_0}$$

and:

$$n_{\theta e} = \frac{n_e}{\sqrt{1 - \frac{n_0^2}{n_e^2}\sin^2\theta_0}}$$

$$\text{where: } n_e = \frac{V_2}{V_1}$$

$$\text{where: } \begin{pmatrix} V_1 \\ V_2 \end{pmatrix} = M_1 M_2 \ldots M_n \begin{pmatrix} 1 \\ n_{\theta 0} \end{pmatrix}$$

$$\text{where: } M_m = \begin{bmatrix} \cos\delta_m & \frac{i}{n_{\theta m}}\sin\delta_m \\ in_{\theta m}\sin\delta_m & \cos\delta_m \end{bmatrix}$$

$$\text{where: } n_{\theta m} = \frac{n_m}{\sqrt{1 - \frac{n_0^2}{n_m^2}\sin^2\theta_0}}$$

and: $\delta_m = \frac{2\pi n_m d_m \sqrt{1 - \frac{n_0^2}{n_m^2}\sin^2\theta_0}}{\lambda}$ Rays will be totally internally reflected if they subtend an angle to the interface which is greater than the critical angle, and an algorithm can be written to calculate by trial and error the thicknesses and refractive indices of a series of coatings which will give a zero coefficient of reflection at angles slightly greater than the critical angle.

Further coatings may be added to bend radiating waves towards the interface normal so that they are scattered by the translucent screen 7 without the pixels becoming too large, and these layers can also be designed as required using an algorithm based on the equations above. For color displays, it will be necessary to design coatings so that rays at the wavelengths of red, green and blue sources each emerge without reflection, and for white light displays the coating may be required to have a graded index.

Figure 3:
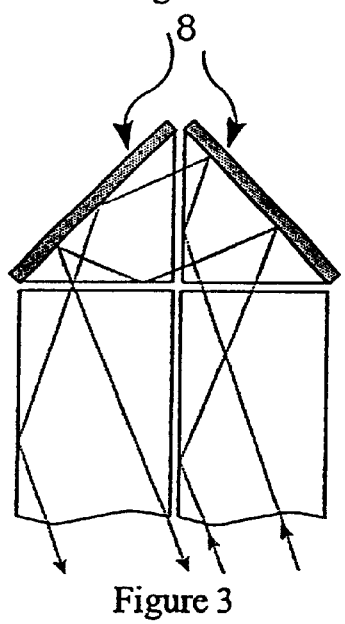
FIG. 3 illustrates how a pair of prisms can be used to fold a waveguide display.
Figure 4:
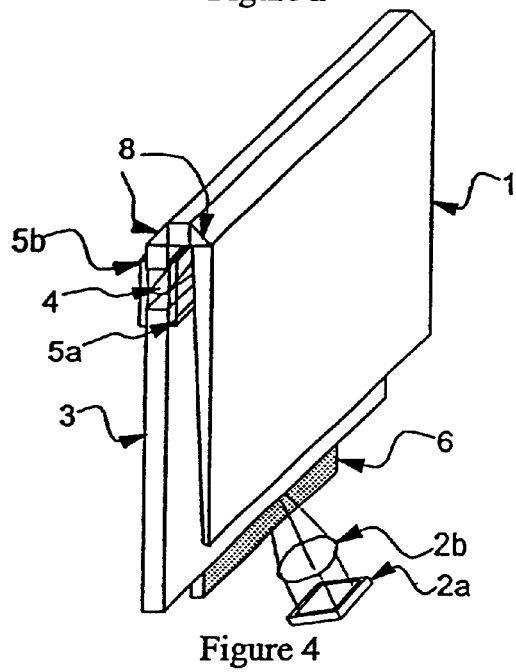
FIG. 4 illustrates a folded tapered waveguide display.

The screen of FIG. 2 should ideally be folded so as to be compact, but the folds in the waveguide must conserve the in-plane and out-of-plane angles of rays round the fold. One way to do this is to curve a waveguide sufficiently gradually that the angles do not change, but the radius of curvature must then be approximately 5 cm and this makes the result rather bulky. FIG. 3 shows how a pair of 45° prisms 8, with silvered hypotenuses and with low-refractive-index material at the other two prism surfaces, can be used to fold light through 180° without loss of in-plane or out-of-plane angle. FIG. 4 shows how the prisms 8 can be used to create a compact tapered waveguide display. The two waveguides have the same width and about the same extent in the propagation direction.

Figure 5:
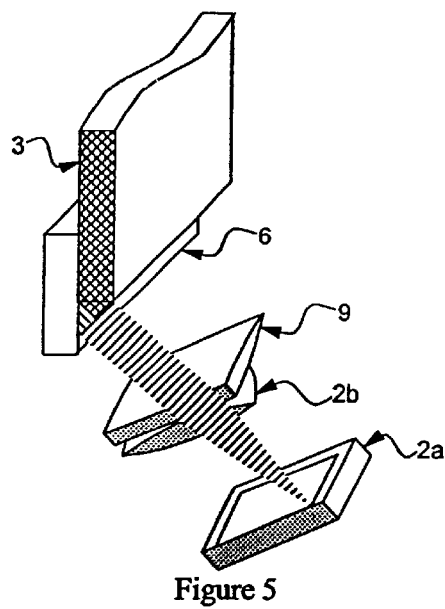
FIG. 5 illustrates a tapered waveguide display with a cylindrical lens and a spherical lens at the entrance to the slab waveguide which improves the resolution of the display.

The lens 2b placed at the entrance to the slab waveguide 3 acts, as shown in FIG. 5, as a projection lens and causes the rays of light to converge to a focus. This reduces the width of the pixels and therefore improves the potential resolution of the display. If the optical path length to each row on the display is slightly different then ideally the focal power of the lens 2b should change with out-of-plane ray angle, for which it will be necessary to optimize a suitable aspheric surface. In the case where optical path length increases with diminishing out-of-plane ray angle, an additional cylindrical lens 9 may be appropriate because its focal power increases with out-of-plane ray angle.

Figure 6:
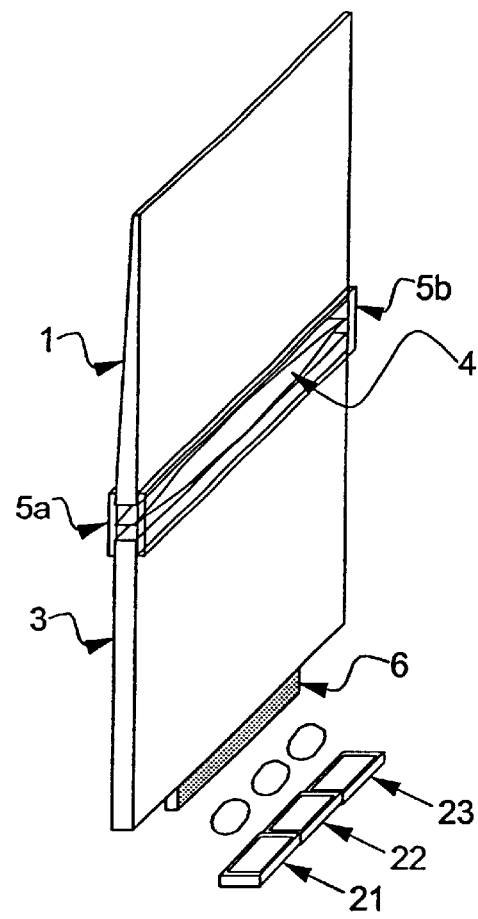
FIG. 6 illustrates a tapered waveguide display which projects a three-dimensional image.

Light leaving the tapered waveguide display is collimated in azimuth, and if the light is scattered by an array of cylindrical lenslets whose axis lies in the horizontal (in the orientation of FIG. 2), then the image will be visible over a single azimuthal angle. Other projectors 21, 22, 23 etc. can therefore be added at the bottom of the slab waveguide as shown in FIG. 6, and each projector will itself create a picture visible on the taper 1 of the waveguide display. However, the picture created by each projector will be visible to a different direction, and if each projector shows a picture of a three-dimensional object imaged from a point of view appropriate to that projector, then the image on the screen 1 of the tapered waveguide will appear three-dimensional. An element which diffuses slightly in azimuth may be needed to eliminate dark zones between adjacent views of the three-dimensional image.

Figure 7:
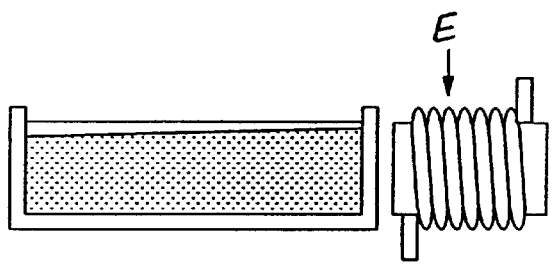
FIG. 7 illustrates a float glass system which produces tapered glass by inducing a slope in the surface of the molten metal by means of an electromagnetic field.

Tapered waveguides can be made by polishing one surface of a slab waveguide at an angle to the other, but this is laborious and expensive. Plastic tapered waveguides could be made by injection moulding, but glass is usually cheaper than plastic. FIG. 7 shows how the float glass method could be adapted so as to make a tapered waveguide. An electromagnet driven by an alternating current is placed next to the molten tin of a conventional flat glass process, so that an alternating magnetic field is induced in the tin which attracts it to the electromagnet. The tin therefore develops a slope so that the glass produced by the surface has a tapered cross-section.

Figure 8:
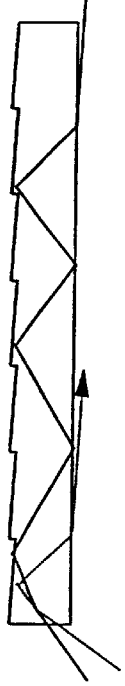
FIG. 8 illustrates a tapered waveguide in which the action of the taper is effected by a grating.

The action of the tapered waveguide is to cause a continuous rate of change of the out-of-plane angle of a ray with the distance which the ray has propagated along the waveguide. Tapering the waveguide is only one way of doing this. Among the alternatives are to provide a slab waveguide 1 with a diffraction grating embossed onto one of the surfaces of the slab waveguide 1, as shown in FIG. 8; to emboss both surfaces of the slab waveguide 1 with blazed diffraction gratings which have slightly different periodicities; and to grade the refractive index of the slab waveguide cladding. The latter two methods are not illustrated.

The action of the cylindrical lens 4 between the pair of front-silvered mirrors is to collimate light from the video projector. A possible alternative is to vary the thickness of the waveguide to slow down central rays. For example if the center is made thinner, as shown in FIG. 9, rays bounce at a steeper angle and their rate of progress along the axis of propagation therefore slows. This principle can of course be applied to waveguides generally, not just displays.

If the large surfaces of a tapered waveguide are flat and the pixels of the video projector are uniformly spaced, then the image on the tapered waveguide will be distorted. This distortion can be removed either by varying the spacing between rows of pixels in the light-emitting array of the video projector, or by varying the slope of the tapered waveguide with a shape which can he found by careful design.

The cylindrical lens 4 and flat waveguide 3 might be replaced altogether by a second tapered waveguide 25 orthogonal to the first in terms of its propagation path, and arranged along the input edge of the first tapered waveguide as shown in FIG. 10. This second waveguide 25 is linear or one-dimensional, and lies in the plane of the output-side tapered waveguide 1. Each of the pair of waveguides expands light from the single projector 27, which injects light into the thick end of the linear waveguide 25, in one each of two dimensions. This second waveguide is also tapered but is essentially one-dimensional, conserving angle in the horizontal plane (i.e. the plane perpendicular to the first waveguide and to the direction of propagation in that waveguide). A series of prisms 26 such as is provided by 3M as Scotch Optical Lighting Film should be placed between the first and second tapered waveguides in order to bend rays away from the surface of the first tapered waveguide and into the edge of the second.

Rays at short wavelengths diverge less than those at longer wavelengths. This divergence can be avoided if only a single wavelength is used. For instance, the image on the screen of a tapered waveguide display can be created in the ultraviolet, or any other suitable wavelength, then converted to color using a screen of red, green and blue phosphors. Ideally the ultraviolet activating illumination should be essentially monochromatic, as might be created by a laser, so that the screen is free of any chromatic aberration. When liquid crystals modulate light onto a photoluminescent screen in this way, they are known to be more effective if the ultraviolet light is collimated. However, the point sources of light used in video projectors are more expensive and less efficient than fluorescent tubes. An alternative is to inject unmodulated light from an ultraviolet fluorescent tube 31 into the tapered waveguide optics as shown in FIG. 11, then to place a large-area liquid-crystal display over the screen of the taper in order to modulate light before it is converted to the visible by phosphors. Alternatively visible light could be used without phosphors, if a monochrome display is sufficient. The tapered waveguide optics are performing the same action as a lens when it collimates light from a small lambertian source to a large collimated source, but the tapered waveguide has the advantage of being flat.

Any light-modulating display can, with suitable modification, be used as an optical switch, and FIG. 12 shows how the tapered waveguide optics can be reconfigured to act as a switch. The direction of the injected light is constant, so that at any one time the light exits each waveguide at only one point, and there are two tapers arranged so as to redirect the light in much the same way as in FIG. 10. The cladding on the exit side of each taper is coated with a layer 41 of material whose refractive index can be varied in a controllable manner, so as to move the point of exit from the waveguide. This determines the position over the plane of the screen at which the ejected ray is emitted. Optical collectors such as fibers are then to be placed against the screen in order to collect the switched ray.

The refractive index of the addressable layer 41 can be varied through 0.1% in about 100 ps using either electrically activated polymers, for instance, or the Kerr effect where the layer of variable refractive index is switched by intense optical illumination. In the latter case the layer of variable refractive index might itself comprise an optical waveguide and the light shone into the edge of the optical waveguide, parallel to the surface of the tapered waveguide. A final refinement is that the refractive index of the two taper cladding layers could be varied sinusoidally in quadrature so that the point of ray emission on the screen describes a circle. The point of emission will complete a revolution of the circle once every 100 ps, but several optical fibers can be laid round the circumference of the circle so that the switch would demultiplex light at a rate possibly greater than 1 THz.

Figure 13:
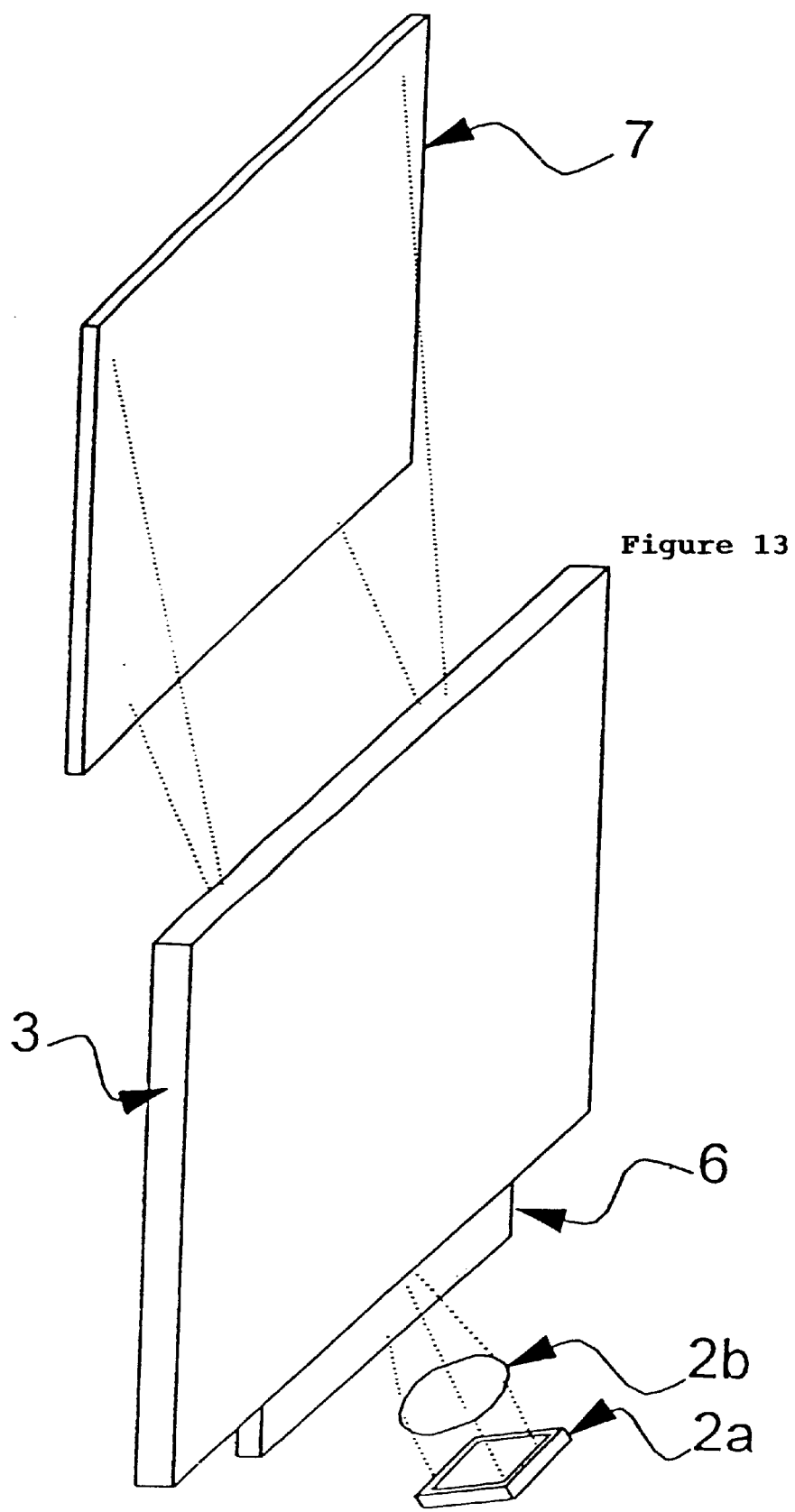
FIG. 13 shows a further embodiment using the waveguiding principle for image expansion.

As shown in FIG. 13, the flat input waveguide 3 can be used for a rather simpler kind of large-area display where the projected image from a relatively small projector 2 is transversely expanded as it travels through the waveguide. The light is thus not input into a tapered waveguide but is simply allowed to emerge from the far edge of the flat waveguide, conserving in-plane and out-of-plane angles, to fall on a screen 7 set somewhat back from the plane of the waveguide. There will be some keystone distortion with this arrangement but this is tolerable in many applications.

The foregoing embodiments are presented by way of example only; the scope of the present invention is to be limited only by the following claims.

What is claimed is:

1. An optical system including a generally planar waveguide having an input edge and a planar extent along which light can propagate by total internal reflection away from the edge, and a source of modulated light arranged to inject light rays into the input edge at a range of out-of-plane angles, the waveguide being constituted as a light-ejecting waveguide such that a ray entering at different a given out-of-plane angle is totally internally reflected up to a point where waveguiding is no longer possible and the ray thus leaves the ejecting waveguide, instead of being totally internally reflected, at different respective a point along the direction of propagation in the waveguide that corresponds to the angle of entry.

2. An optical system according to claim 1, in which the waveguide is tapered so as to narrow along its direction of propagation.

3. An optical system according to claim 1 and further including an anti-reflection coating on one face of the waveguide.

4. An optical system according to claim 3 and further including means for re-directing the light leaving the waveguide towards the normal to the plane of the waveguide.

5. An optical system according to claim 1 and further including an input waveguide arranged to direct light input from the source so that it is injected substantially over the whole of the said input edge of the ejecting waveguide.

6. An optical system according to claim 5, in which the input waveguide is itself a planar or slab waveguide with an input edge, arranged to spread light originating from a point on the input edge within the plane, while preserving its out-of-plane angle, so as to inject the light into the said edge of the ejecting waveguide.

7. An optical system according to claim 6, and further including means for coupling the light from the input waveguide into the said input edge of the ejecting waveguide.

8. An optical system according to claim 6, in which the light source is a projector arranged to inject modulated light at various out-of-plane angles into the input waveguide.

9. A system according to claim 8 and having a plurality of projectors arranged along the input edge of the input waveguide.

10. A system according to claim 9 and being a display.

11. A system according to claim 10, in which each of the projectors inputs a different image in such a way that a 3-D display is formed.

12. An optical system according to claim 6 and further including an optical diverter conserving in-plane and out-of-plane angle and allowing the two planar waveguides to be folded over each other.

13. An optical system according to claim 5, in which the input waveguide is essentially one-dimensional and is arranged along the said input edge of the ejecting waveguide, the input waveguide being constituted in such a way that rays of different out-of-line angles injected into its one end will leave it at different points along its length, thereupon to be injected into the planar waveguide.

14. An optical system according to claim 13, in which the light source is a projector arranged to inject modulated light into the linear waveguide.

15. An optical system according to claim 14, in which the projector is arranged to inject light at various out-of-line angles into the linear waveguide.

16. The optical system in claim 6, wherein the input waveguide and the ejecting waveguide lie one over the other, and the system further includes a pair of prisms folding the light emerging from the input waveguide back into the ejecting waveguide.

17. An optical modulating device including:

a generally planar waveguide having an input edge and a planar extent along which light can propagate by total internal reflection way from the edge, the waveguide being constituted as a light-ejecting waveguide such that rays entering at different out-of-plane angles leave the waveguide, instead of being totally internally reflected, at different respective points along the waveguide, an input waveguide that is essentially one-dimensional and is arranged along the said input edge of the ejecting waveguide, in order to direct light input from a source substantially over the whole of the said input edge of the ejecting waveguide, and a source of modulated light arranged to inject light rays into the input waveguide;

each waveguide further including an addressable part arranged to alter the position at which light leaves the respective waveguide, the source being adapted to input light into the input waveguide at a single angle and ray collection devices such as optical fibers being arranged to collect the ray emitted from the planar ejecting waveguide as the points of emission are varied.

18. An optical system including a generally planar waveguide having an input edge and a planar extent along which light can propagate by total internal reflection away from the edge, and a source of light arranged to inject light rays into the input edge at a range of out-of-plane angles, the waveguide being constituted as a light-ejecting waveguide such that a ray entering at a given out-of-plane angle is totally internally reflected up to a point where waveguiding is no longer possible and the ray thus leaves the ejecting waveguide, instead of being totally internally reflected, at a point along the direction of propagation in the waveguide that corresponds to the angle of entry, and further including an input waveguide arranged to direct light input from the source so that it is injected substantially over the whole of the said input edge of the ejecting waveguide, the input waveguide itself being a planner or slab waveguide with an input edge, arranged to spread light originating from a point on the input edge within the plane while preserving its out-of-plane angle, so as to inject the light into the said edge of the ejecting waveguide.

19. An optical system according to claim 18, in which the input waveguide is a generally planar sheet-like optical waveguide having an input end and an output end and being formed with a selectively varying thickness so as to divert the course of a wave front propagating in the plane of the input waveguide from the said point on the input edge.

* * * * *

UNITED STATES PATENT AND TRADEMARK OFFICE
CERTIFICATE OF CORRECTION

PATENT NO. : 6,608,961 B2  Page 1 of 1
APPLICATION NO. : 09/812722
DATED : August 19, 2003
INVENTOR(S) : Adrian Robert Leigh Travis It is certified that error appears in the above-identified patent and that said Letters Patent is hereby corrected as shown below:

On the Title Page, Item (73) under Inventor, the following text should appear:
--Assignee: Cambridge Flat Projection Displays Limited, United Kingdom--

Claim 1, line 63, delete the word "different"; and, line 67, delete the words "different respective"

Signed and Sealed this

Twenty-fifth Day of December, 2007

JON W. DUDAS
*Director of the United States Patent and Trademark Office*